United States Patent
Margheritta et al.

(10) Patent No.: US 12,294,192 B2
(45) Date of Patent: May 6, 2025

(54) TWO-PART ELECTRICAL POWER CONTACT FOR A CHARGING CIRCUIT FOR CHARGING AN ELECTRIC VEHICLE

(71) Applicant: Baud Industries, Fillinges (FR)

(72) Inventors: Christophe Margheritta, Fillinges (FR); Jean-Noel Baud, Fillinges (FR)

(73) Assignee: Baud Industries, Fillinges (FR)

( * ) Notice: Subject to any disclaimer, the term of this patent is extended or adjusted under 35 U.S.C. 154(b) by 362 days.

(21) Appl. No.: 17/754,394

(22) PCT Filed: Oct. 12, 2020

(86) PCT No.: PCT/EP2020/078623
§ 371 (c)(1),
(2) Date: Mar. 31, 2022

(87) PCT Pub. No.: WO2021/069742
PCT Pub. Date: Apr. 15, 2021

(65) Prior Publication Data
US 2022/0344839 A1      Oct. 27, 2022

(30) Foreign Application Priority Data
Oct. 10, 2019 (FR) ..................................... 1911245

(51) Int. Cl.
*H01R 4/06* (2006.01)
*H01R 4/20* (2006.01)
(Continued)

(52) U.S. Cl.
CPC .................. *H01R 4/06* (2013.01); *H01R 4/20* (2013.01); *H01R 13/04* (2013.01); *H01R 13/10* (2013.01);
(Continued)

(58) Field of Classification Search
CPC .. H01R 2201/26; H01R 13/111; H01R 13/04; H01R 13/10; H01R 4/06; H01R 43/0207
(Continued)

(56) References Cited

U.S. PATENT DOCUMENTS 4,447,109 A * 5/1984 Hobart, Jr. ............. H01R 4/028
439/874
5,358,433 A    10/1994 Dechanteloup et al.
(Continued)

FOREIGN PATENT DOCUMENTS

CN     106961046 A *  7/2017 .............. F16F 1/376
CN     108666790 A * 10/2018
(Continued)

OTHER PUBLICATIONS

EP1973199 original w/translation (Year: 2008).*
(Continued)

*Primary Examiner* — Marcus E Harcum
(74) *Attorney, Agent, or Firm* — Chiesa Shahinian & Giantomasi PC

(57) ABSTRACT

An electrical power contact, for a fixed electrical outlet of a vehicle for connecting a battery of the vehicle to an external DC electrical source, consists of two conductive parts mechanically cold-assembled through snap-riveting, connecting part and a connection terminal. A first of the two conductive parts is provided with a shoulder and with a protruding portion protruding with respect to the shoulder, the other conductive part comprising a wall having a bearing face bearing against the shoulder and a free face opposite the bearing face. The wall is has a through-hole opening onto a counterbore forming a recess for the free face. The protruding portion passes through the through-hole and has a head housed in the counterbore.

6 Claims, 8 Drawing Sheets

(51) Int. Cl.
*H01R 13/04* (2006.01)
*H01R 13/10* (2006.01)
*H01R 43/02* (2006.01)
*H01R 43/16* (2006.01)

(52) U.S. Cl.
CPC ......... *H01R 43/0207* (2013.01); *H01R 43/16* (2013.01); *H01R 2201/26* (2013.01)

(58) Field of Classification Search
USPC ........................................................ 439/886
See application file for complete search history.

(56) References Cited

U.S. PATENT DOCUMENTS

| | | | | |
|---|---|---|---|---|
| 5,882,224 | A * | 3/1999 | Gauker | H01R 13/7032 |
| | | | | 439/510 |
| 7,048,596 | B2 * | 5/2006 | Swearingen | H01R 4/4881 |
| | | | | 439/843 |
| 9,899,750 | B1 * | 2/2018 | Doiron | H01R 4/183 |
| 9,941,617 | B2 * | 4/2018 | Spitzenberger | H01R 13/04 |
| 10,256,565 | B2 * | 4/2019 | Kraemer | H01R 13/111 |
| 10,594,053 | B2 * | 3/2020 | Koellmann | H01R 9/2675 |
| 10,717,368 | B2 * | 7/2020 | Wenz | H01R 4/308 |
| 11,585,363 | B1 * | 2/2023 | Briggs | F16B 19/1045 |
| 2003/0077950 | A1 | 4/2003 | Swearingen et al. | |
| 2007/0049132 | A1 | 3/2007 | Uchida et al. | |
| 2014/0141659 | A1 * | 5/2014 | Ramm | H01R 43/02 |
| | | | | 439/736 |
| 2019/0273354 | A1 * | 9/2019 | Sato | H01R 43/0207 |

FOREIGN PATENT DOCUMENTS

| | | | |
|---|---|---|---|
| CN | 110176679 A * | 8/2019 | |
| DE | 102004031133 B3 * | 12/2005 | H01R 13/04 |
| EP | 0574293 A1 | 12/1993 | |
| EP | 2854222 A1 | 4/2015 | |
| EP | 3223371 A2 | 9/2017 | |
| WO | 2013046663 A1 | 4/2013 | |
| WO | 2016104387 A1 | 6/2016 | |

OTHER PUBLICATIONS

DE102011088402 original w/translation (Year: 2013).*
International Search Report and Written Opinion mailed Jan. 15, 2021, in connection with International Patent Application No. PCT/EP2020/078623, filed Oct. 12, 2020, 15 pgs (including translation).

* cited by examiner

TWO-PART ELECTRICAL POWER CONTACT FOR A CHARGING CIRCUIT FOR CHARGING AN ELECTRIC VEHICLE

CROSS-REFERENCE TO RELATED APPLICATIONS

This application is a national stage of International Patent Application Serial No. PCT/EP2020/078623, filed Oct. 12, 2020, which claims priority to French Patent Application No. 1911245, filed Oct. 10, 2019; the disclosures of all are incorporated herein by reference in their entirety.

TECHNICAL FIELD OF THE INVENTION

The invention relates to an electrical power contact for the passage of direct or alternating currents of high intensity, in particular an electrical power contact intended for charging an electric vehicle, and in particular to an electrical power contact intended to supply the vehicle battery with direct current.

STATE OF THE PRIOR ART

In document EP 3223371 A2, an electrical power contact is described for the passage of high currents, consisting of two separate solid conductive parts fixed to each other by removable means. The removable connection allows dismantling, if necessary, but leads to a complexity of manufacture and assembly that affects the cost price.

Document EP 0574293 A1 describes an electrical power contact for the passage of direct currents greater than 10 Amps, consisting of two separate solid conductive parts, namely: a female connecting part to an external electrical source, and a connection terminal for connecting the electrical power contact to a stripped end of a conductor connected directly or indirectly to a battery terminal of a vehicle. The connection terminal is provided with a shoulder and with a projecting threaded portion with respect to the shoulder, the female connecting part comprising a wall having a bearing face bearing against the shoulder and a free face opposite the bearing face, the wall being passed through by a threaded through-hole having an open end on the bearing face and an opposite end open on a counterbore constituting a recess in the free face, the portion being screwed into the threaded hole. The connection by screwing between the two conductive parts allows dismantling if necessary, but requires machining and assembly operations that increase the cost of the electrical contact.

Document EP 2854222 A1 describes a generic electrical contact, intended for example for a printed circuit board or a connector, consisting of two parts, one forming a socket having a cylindrical inner wall, a solid bottom and an inner radial annular groove connecting the bottom and the cylindrical portion, the other forming a pin that is inserted into the socket so as to undergo a plastic deformation that causes it to fill the annular groove, thus joining the two parts together in a non-removable manner. The plastic deformation is obtained by applying, after insertion of the pin in the socket and docking of the pin in contact with the bottom of the socket, an axial force sufficient to obtain the deformation of the pin and the filling of the annular groove. Such a manufacturing method is well suited to small electrical contacts for low-current applications, but the mechanical power necessary for the deformation of the pin quickly becomes limiting when the sections of the parts increase. There is also a risk of deforming the pin by applying the pressure necessary for the deformation of the end of the pin located inside the socket, which may lead to having to oversize the part of the pin located outside of the socket where appropriate.

DISCLOSURE OF THE INVENTION

The invention aims to remedy the drawbacks of the state of the art and to propose an electrical contact in two conductive parts and the manufacturing method thereof, which are particularly suitable for applications requiring large current passage sections, in particular applications for the passage of direct currents greater than 10 Amps, or even greater than 50 or 100 Amps, although alternating current applications are not excluded.

To do this, according to a first aspect of the invention, an electrical power contact is proposed for the passage of direct currents greater than 10 Amps, consisting of two separate solid conductive parts made from metal, namely a connecting part and a connection terminal for connecting the electrical power contact to a conductor. A first of the two conductive parts is provided with a shoulder and with a protruding portion with respect to the shoulder, a second of the two conductive parts comprising a wall having a bearing face bearing against the shoulder and a free face opposite the bearing face, the wall being passed through by a through-hole having an open end on the bearing face and an opposite end open on a counterbore constituting a recess in the free face. Remarkably, the protruding portion passing through the hole and has a flared free end forming a head housed in the counterbore, the head having a cross-section greater than a passage section of the through-hole.

Such an electrical power contact may in particular be integrated into a fixed electrical outlet of a vehicle or of a charging station with a view to connecting a battery of the vehicle to an external electrical source, or for electrical power connections internal to the vehicle, for example between the battery and a current converter, or between the current converter and the electric motor. The connection terminal may in particular be provided with an interface for soldering or crimping a wired electrical conductor or for mechanically fixing an electrical conductor, which may be a stripped wired conductor, an electrical bar or a plate, by means of a fixing element such as a screw, a rivet or a bolt.

The free face of the wall of the second conductive part is accessible, since it is not covered, which allows access to the free end of the protruding portion of the first part from this face, and allows implementation of mechanical forming of the head with a tool positioned on the side of the free face. The forming of the head therefore does not generate significant stresses in the portion of the first part located on the side of the shoulder opposite the protruding portion.

The connection thus formed between the two conductive parts cannot be dismantled, in the sense that any dismantling requires the irreversible destruction of at least one of the parts.

The counterbore is a flared opening at the end of the through-hole, which may have different shapes. Preferably, the counterbore consists of a set of one or more faces having a symmetry of revolution about a common axis, the set of faces preferably comprising one or more faces from among the following: a frustoconical face; a flat annular face; a cylindrical face.

The rotational symmetry of the walls forming the counterbore makes it possible to envisage progressive forming of the head by a crimping or snap-riveting tool having an orbital movement about the axis of revolution.

Preferably, the flared free end of the protruding portion does not protrude from the wall. The head is thus protected during subsequent connection operations of the contact.

Preferably, the through-hole is cylindrical. This may be a machined bore or a hole formed in the blank.

The protruding portion comprises an intermediate portion between the head and the shoulder, the intermediate portion being housed in the through-hole. The intermediate portion is preferably without contact or in close contact with the through-hole. The dimensions of the intermediate portion of the protruding portion allow insertion without shrinking the protruding portion in the through-hole. Even if there is contact between the intermediate portion and the walls of the through-hole, the electrical contact resistance at this level is higher than at the interface between the head and the counterbore so that the electrical current lines preferentially cross this interface, where the contact pressure is the greatest.

According to one embodiment, the connection terminal is formed by the first conductive part. Alternatively, the connection terminal is formed by the second conductive part.

The connection terminal may have various shapes in order to adapt to different connection modes of a conductor or different orientations. It is possible in particular to envisage the connection terminal being tubular or angled. The conductor to which the connection terminal is intended to be connected may in particular be a wired conductor, an electric bar or a plate. The connection terminal may have soldering or crimping surfaces, or a fixing interface, for example a fixing hole, to allow the connection of a conductor via a fixing element, for example a screw, rivet or bolt.

The connecting part is intended for a removable connection with a connecting part of complementary shape to an electrical outlet. The connecting part may form a pin or a socket, the characteristics of which may be standardized.

Preferably, the connecting part has a surface treatment, preferably silver plating or nickel plating, to reduce its contact resistance and/or to provide protection against corrosion.

The contact interface between the head and the counterbore is preferably free of welding or brazing.

According to one embodiment, the connecting part is capable of being connected to an external electrical source, and the connection terminal is capable of being connected to a stripped end of a conductor connected directly or indirectly to a battery terminal of a vehicle, for charging of the battery of the vehicle by the external electrical source.

According to one embodiment, the connecting part forms a pin suitable for insertion into a socket or a socket into which a pin may be inserted, and defines an insertion axis, the protruding portion, the through-hole and the counterbore being centered on the insertion axis.

According to another aspect of the invention, the latter relates to a batch of several electrical power contacts of different dimensions, comprising a first electrical power contact and a second electrical power contact as described above, the protruding portion of the first of the two conductive parts of the first electrical contact having dimensions identical to the protruding portion of the first of the two conductive parts of the second electrical contact, the through-hole and the counterbore of the second of the two conductive parts of the first electrical contact having dimensions identical to the through-hole and to the counterbore of the second of the two conductive parts of the second electrical contact. The identical dimensions allow standardization of the assembly of the parts, and make it possible to offer modular electrical contacts, for example having the same first part and different second parts, or the same second part and different first parts. The connecting parts may in particular differ from one another by the fact that some are pins and others are sockets, or by the fact that some have larger diameters than others. The connection terminals may differ from one another in that some have a flat, planar or angled soldering interface for soldering a stripped end of a wire conductor, and others have a cylindrical interface for soldering a stripped end of a wired conductor.

According to another aspect of the invention, the latter relates to a method of manufacturing an electrical power contact as described above, which comprises forming the head by cold deformation, and forming a contact interface between the head and the counterbore without welding or brazing.

Preferably, the counterbore does not undergo plastic deformation during the cold deformation of the head.

Preferably, the cold deformation is carried out without burring. Preferably, the cold deformation is carried out by snap-riveting, using a rivet preferably having an orbital movement about an axis of symmetry of the head.

Before cold deformation, the protruding portion is inserted into the through-hole without shrinking. Alternatively, it may be shrunk into the through-hole.

BRIEF DESCRIPTION OF FIGURES

Other features and advantages of the invention will emerge on reading the following disclosure, with reference to the appended figures, which illustrate.

For greater clarity, identical or similar elements are identified by identical reference signs in all of the figures.

DETAILED DESCRIPTION OF EMBODIMENTS

Figure 1:
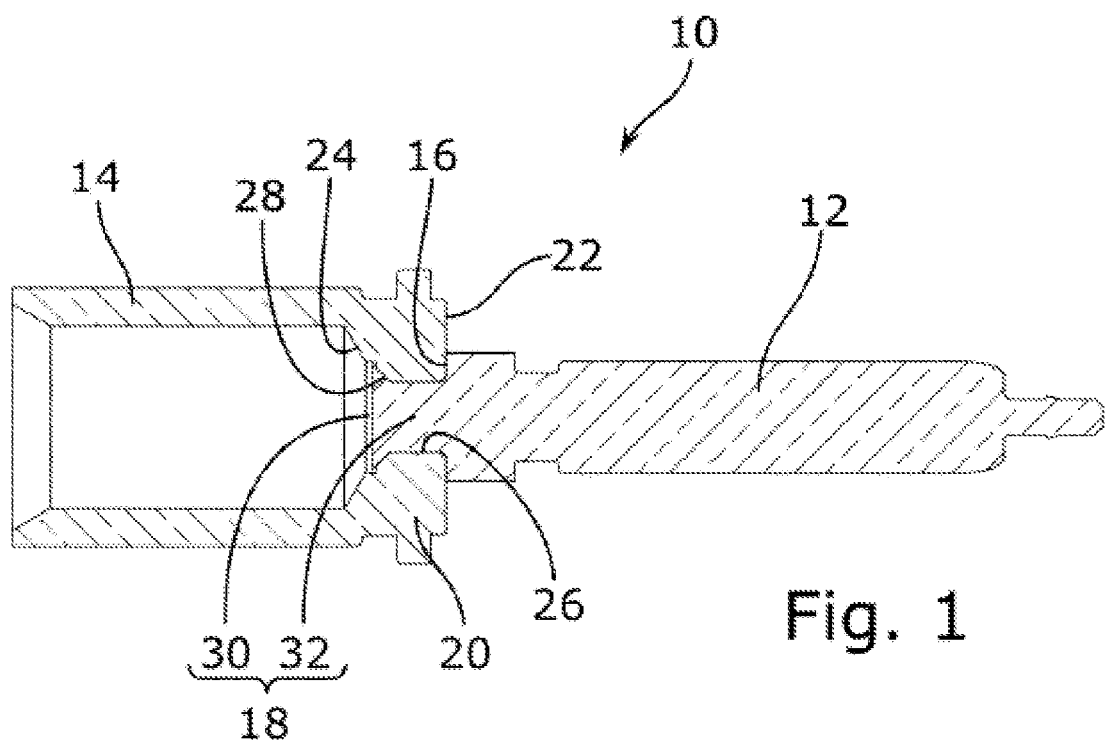
FIG. 1, an axial sectional view of an electrical contact according to a first embodiment of the invention FIG. 2, an isometric view in axial section of the electrical contact of FIG. 1.
Figure 2:
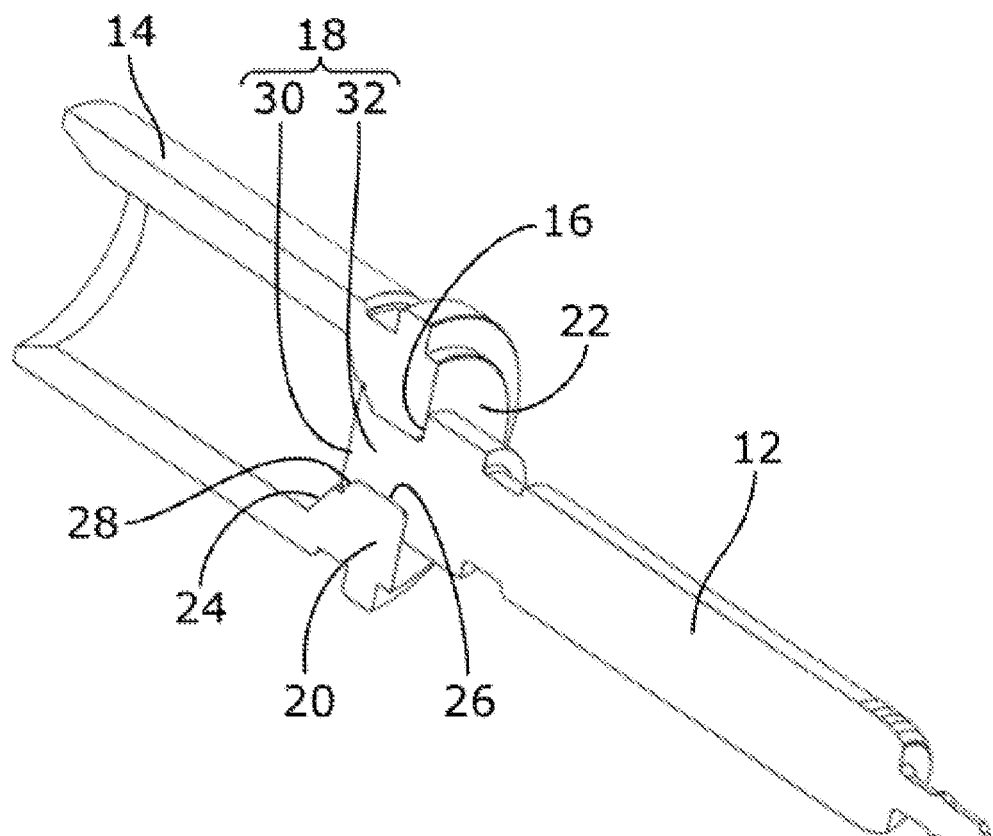

FIGS. 1 and 2 illustrate an electrical contact 10 intended to equip an electrical outlet attached to the body of a vehicle for the connection of a vehicle battery to an external DC power source. This electrical contact is intended to be mounted in an insulating outlet body, fixed to the bodywork. In practice, such a fixed outlet, or base, comprises power contacts for conveying high-intensity direct currents, which may exceed 50 or even 100 Amps, as well as control contacts used to transmit information between the vehicle and the external charging device. The electrical contact 10 of FIG. 1 may of course be used for both types of use, but is more particularly intended, due to its dimensions and its electrical resistance characteristics, for the transmission of high currents.

The electrical contact 10 is made up of two separate solid metal conductive parts, namely a connecting part 12 to the external electrical source, and a connection terminal 14 for connecting the electrical power contact 10 to a stripped end of a wire conductor that is connected directly or indirectly to a terminal of the vehicle battery. In this embodiment, the connecting part 12 is a solid pin having a symmetry of revolution about a reference axis 100 of the electrical contact 10 and having a functional surface that has a standardized profile to penetrate into a socket or a bell of another outlet. The connection terminal 14 is tubular to accommodate the stripped end of a connection cable to a vehicle battery for the purpose of welding or crimping this stripped end, and also has a symmetry of revolution about the reference axis 100.

The invention relates more particularly to the attachment between these two parts 12, 14, which must not be able to be dismantled and which must have mechanical characteristics of resistance to forces and vibrations and electrical characteristics of minimum resistance in order to avoid contact losses and heating.

In FIGS. 1 and 2, which illustrate the electrical contact 10 after assembly of the two parts 12, 14, it can be seen that a first of the two conductive parts, here the connecting part 12, is provided with a shoulder 16 and a protruding portion 18, projecting with respect to the shoulder 16.

The second conductive part, here the connection terminal 14, comprises a wall 20 having a bearing face 22 bearing against the shoulder 16 and a free face 24 opposite the bearing face 22. The wall 20 is passed through by a cylindrical opening 26 having an open end on the bearing face 22 and an opposite end open on a counterbore 28 that is recessed with respect to the free face 24.

The protruding portion 18 passes through the through-hole 26 and has a flared free end 30 forming a head housed in the counterbore 28, the head 30 having a cross-section greater than a passage section of the through-hole 26. The protruding portion 18 comprises an intermediate portion 32 between the head 30 and the shoulder 16, this intermediate portion 32 being housed in the through-hole 26, in close contact with the walls of the through-hole 26.

Figure 3:
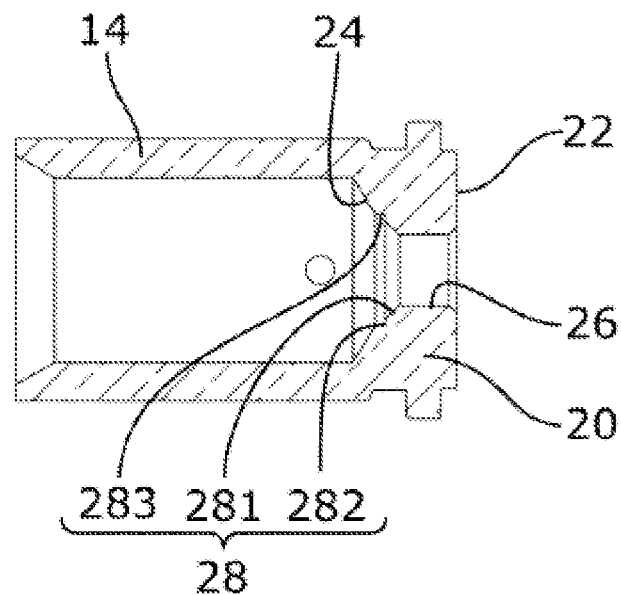
FIG. 3, an axial sectional view of a connection terminal of the electrical contact of FIG. 1.

FIG. 3, which illustrates the second conductive part 14 before assembly, shows that the counterbore 28 is constituted by a succession of faces having a symmetry of revolution about a common axis 100, which is the axis of the cylindrical hole 26, and more precisely, a flared frustoconical face 281 leading to an annular planar face 282 surrounded by a cylindrical face 283.

Figure 4:
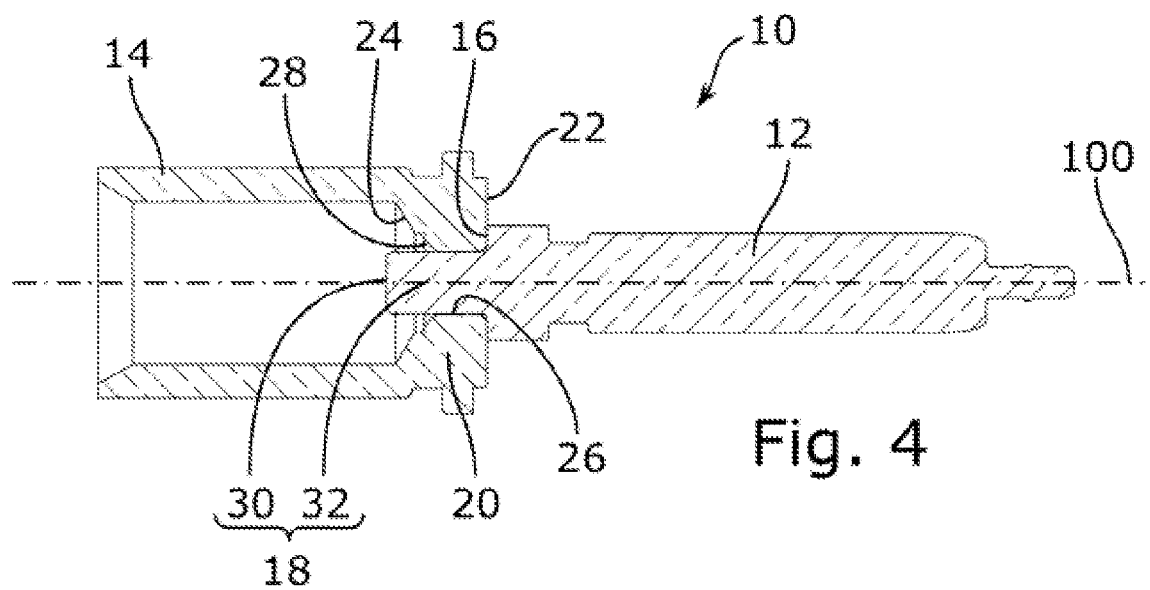
FIG. 4, an axial sectional view of a step of assembling the connection terminal of FIG. 3 with a connecting part to form the electrical contact of FIG. 1.
Figure 5:
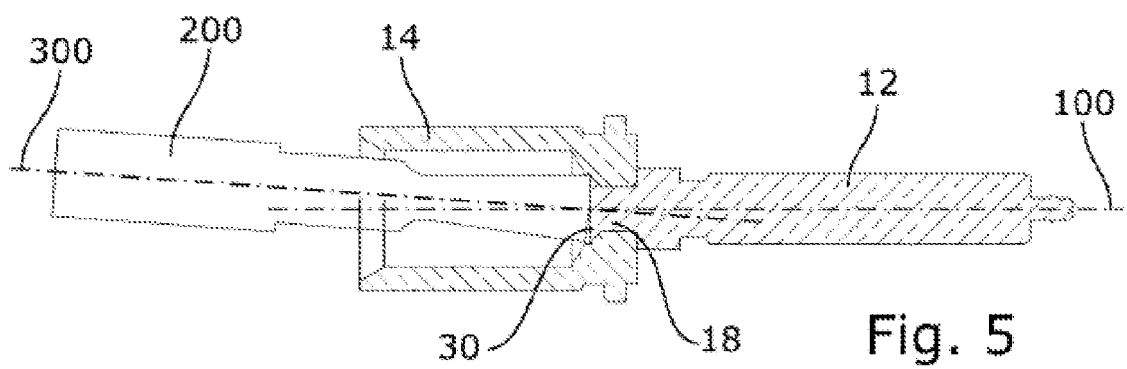
FIG. 5, an axial sectional view of a step of cold deformation of a free end of the connecting part by snap-riveting, after the assembly step of FIG. 4.

The assembly of the electrical contact comprises a first step of positioning the two parts, illustrated in FIG. 4, followed by a step of irreversibly securing the two parts, illustrated in FIG. 5. FIG. 4 shows that the protruding portion 18 of the first part 12, in this stage, is cylindrical and that its free end does not yet comprise the enlarged section head. The protruding portion 18 has passed through the through-hole 26 and its free end protrudes with respect to the counterbore 28, whereas the bearing wall 22 bears against the shoulder 16. In this case, the protruding portion 18 of the first part 12 has been made to penetrate the hole 26 without any particular effort, because the dimensions of the two parts are adjusted, in the sense that they do not present any dimensional interference that would impose shrinking.

To form the enlarged head 30, a rivet 200 is introduced into the connecting part 14. The rivet combines a movement of revolution about its axis 300 and a movement of precession of its axis of revolution about the reference axis 100 of the through-hole 26, which allow it to roll on the free end 30 of the protruding portion 18 and gradually, in successive passes, to push the material from the free end of the protruding portion 18 radially into the available volume delimited by the counterbore 28.

This deformation is carried out cold and the pressures exerted are low, so that the counterbore does not undergo plastic deformation. The resulting assembly cannot be dismantled. The two parts 12, 14 are preferably made of an identical metallic material, in particular copper or brass, so that the connection does not undergo differential thermal deformation. The interface between the two parts 12, 14 is produced without welding or brazing and does not require any subsequent treatment.

During use, the current passes between the two parts 12, 14 preferentially in the contact zone between the head 30 and the chamfer 28, and to a lesser extent at the planar interface between the bearing face 22 and the shoulder 16.

Figure 6:
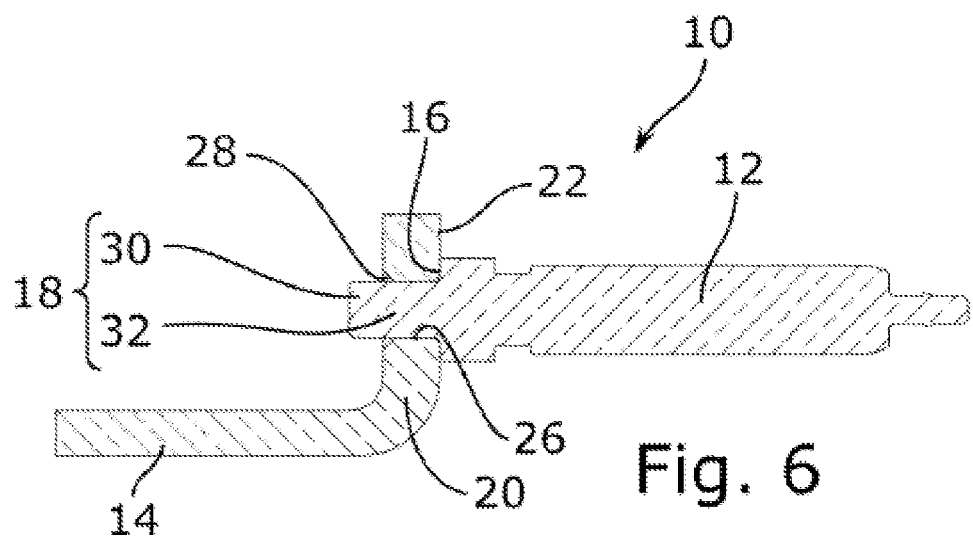
FIG. 6, an axial sectional view of an assembly step of an electrical contact according to a second embodiment of the invention.
Figure 7:
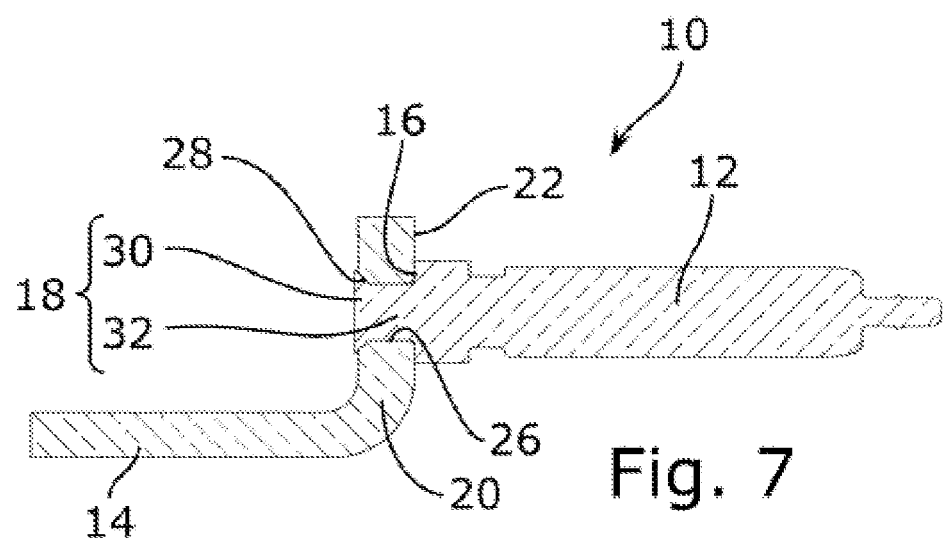
FIG. 7, an axial sectional view of the contact of FIG. 6 after assembly.
Figure 8:
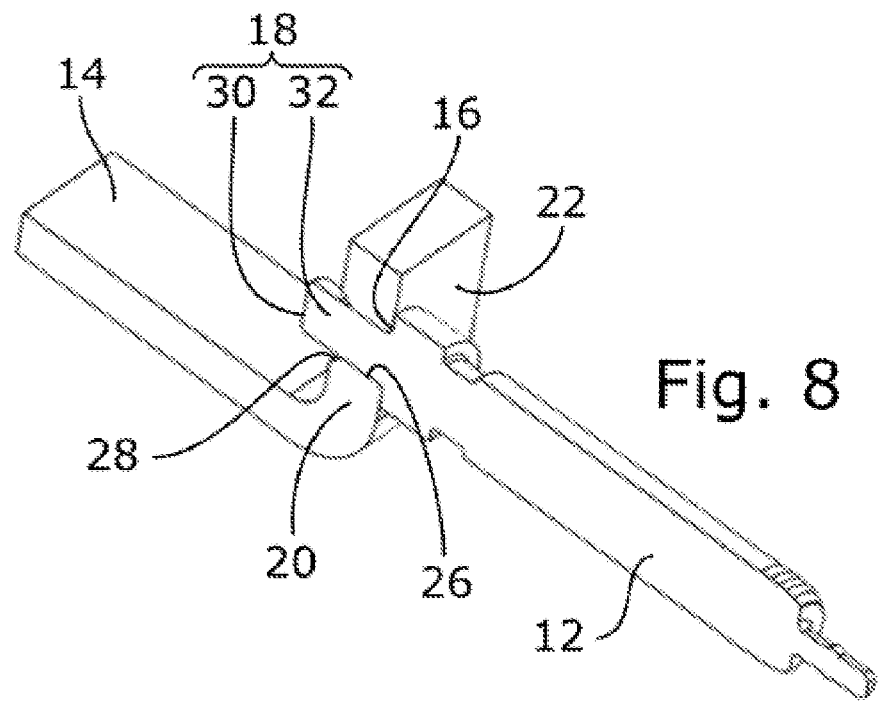
FIG. 8, an isometric view in axial section, of the assembly step of FIG. 6.

FIGS. 6 to 8 illustrate an electrical contact according to a second embodiment, which differs from the previous one by the shape of the connection terminal 14, in the shape of a square, allowing flat welding of one end stripped of a connection cable to the vehicle battery.

Figure 9:
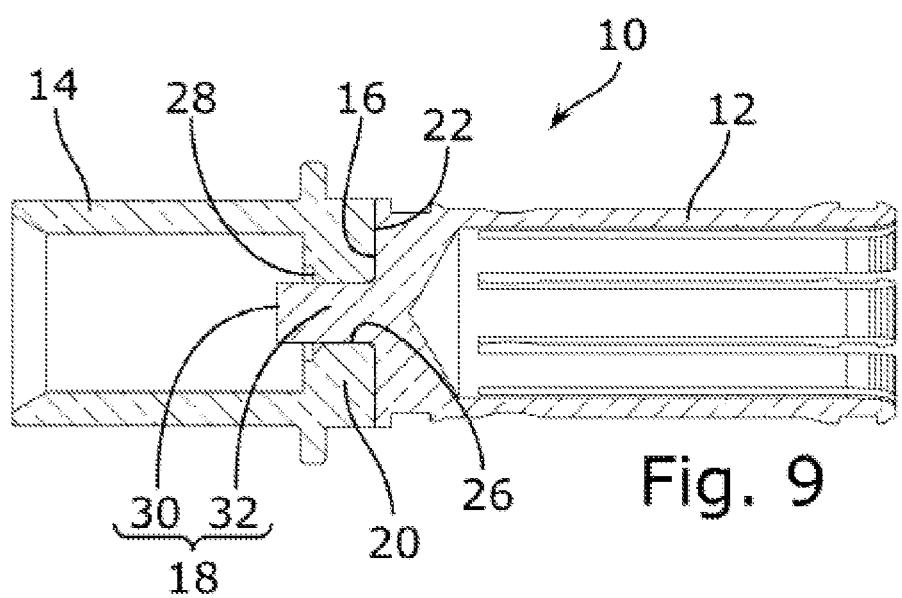
FIG. 9, an axial sectional view of an assembly step of an electrical contact according to a third embodiment of the invention.
Figure 10:
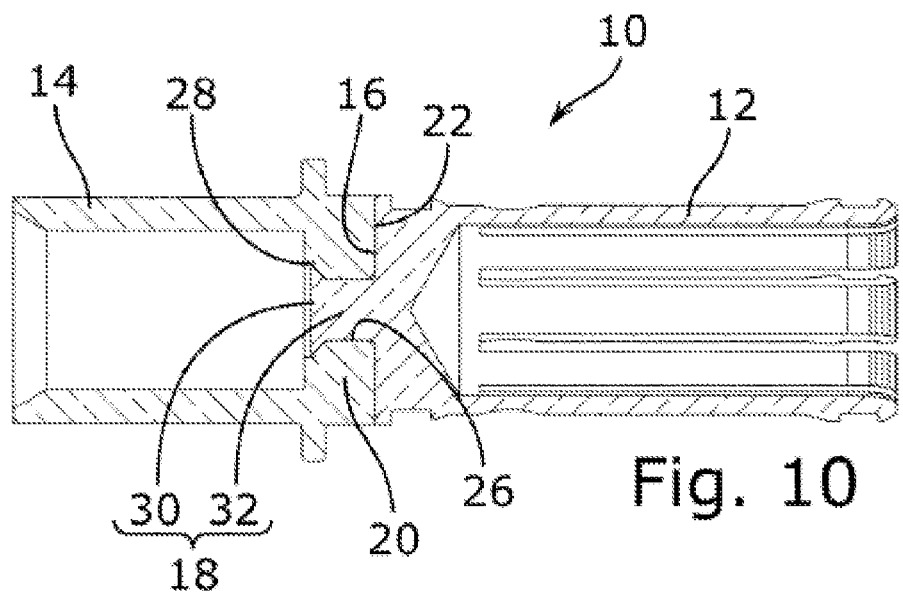
FIG. 10, an axial sectional view of the contact of FIG. 9 after assembly.
Figure 11:
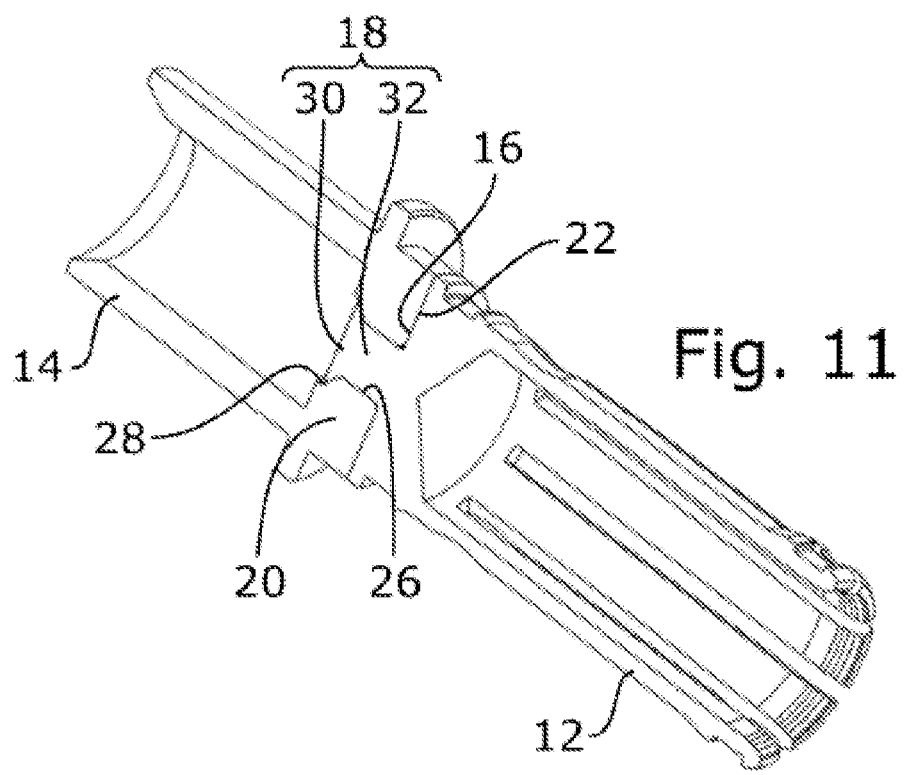
FIG. 11, an isometric view in axial section of the electrical contact of FIG. 10.

FIGS. 9 to 11 illustrate an electrical contact according to a third embodiment, which differs from the first embodiment by the shape of the connecting part 12, which is a socket forming a bulb intended to receive a pin by elastically deforming.

Figure 12:
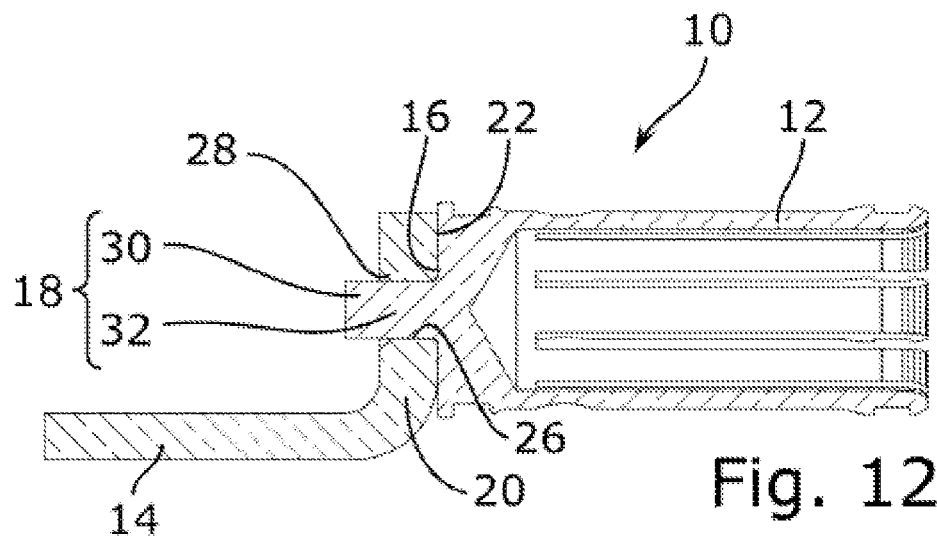
FIG. 12, an axial sectional view of an assembly step of an electrical contact according to a fourth embodiment of the invention.
Figure 13:
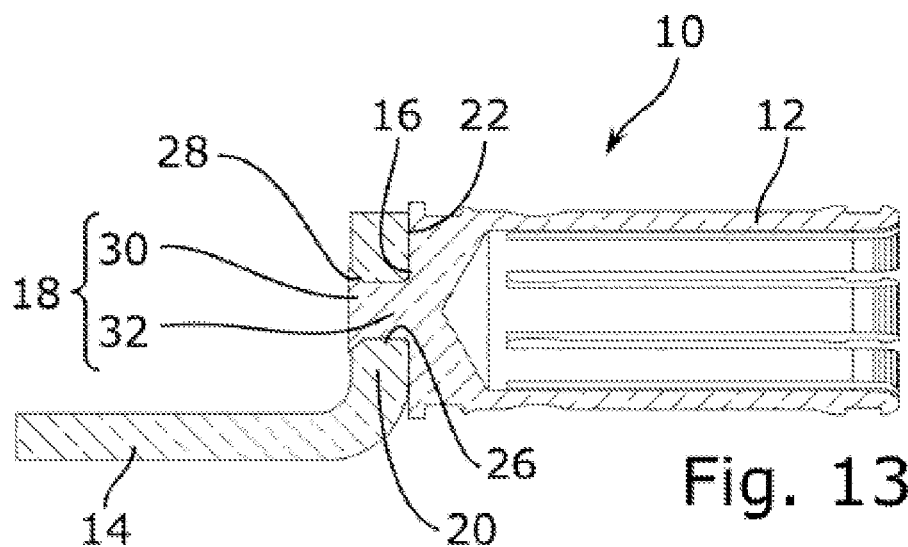
FIG. 13, an axial sectional view of the contact of FIG. 12 after assembly.
Figure 14:
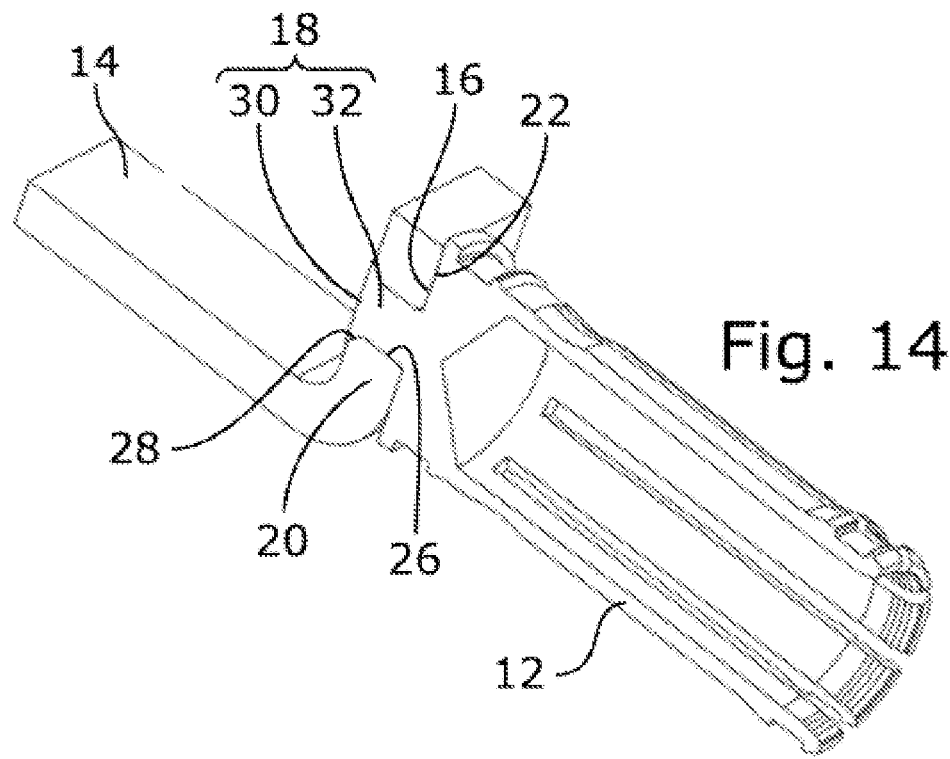
FIG. 14, an isometric view in axial section of the electrical contact of FIG. 13.
Figure 15:
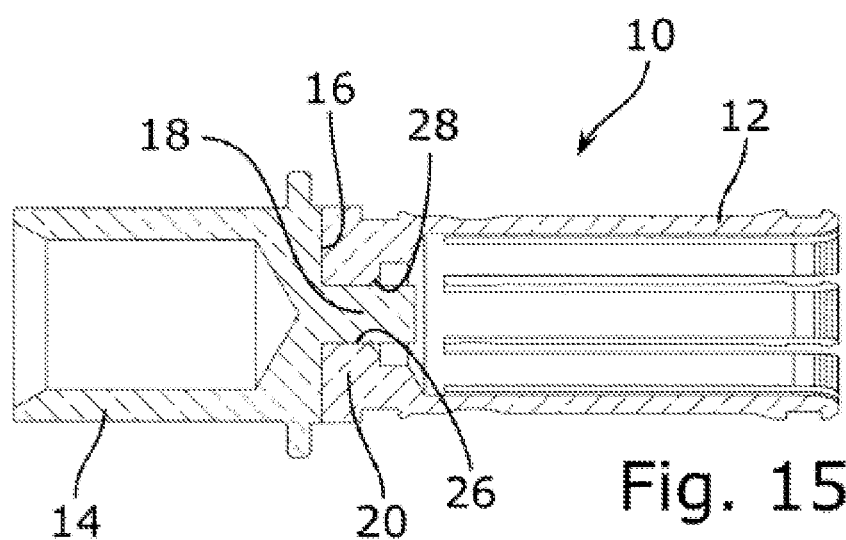
FIG. 15, an axial sectional view of an assembly step of an electrical contact according to a fourth embodiment of the invention.
Figure 16:
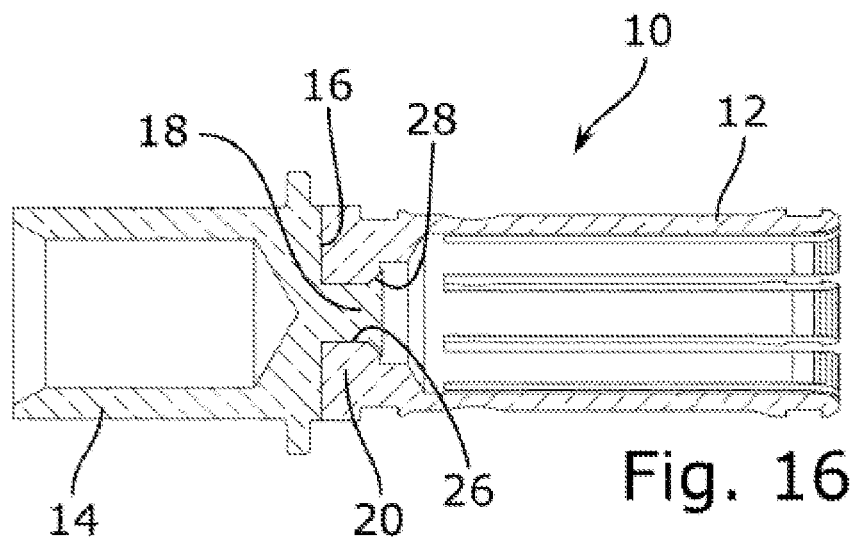
FIG. 16, an axial sectional view of the contact of FIG. 15 after assembly.
Figure 17:
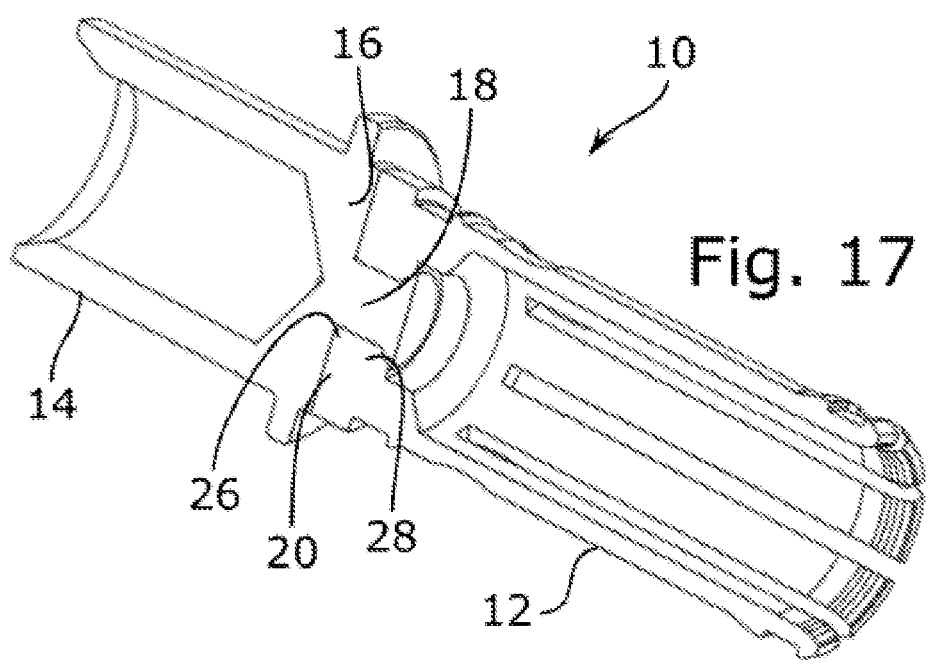
FIG. 17, an isometric view in axial section of the electrical contact of FIG. 15.

FIGS. 12 to 14 illustrate an electrical contact that combines the connecting part 12 of the third embodiment and the angled connection terminal of the second embodiment.

In each of the second, third and fourth embodiments, the assembly of the two parts 12, 14 is carried out in a manner similar to the first embodiment, by first inserting the protruding portion 18 of the first part 12 in the through-hole 26 of the second part, then by deforming the free end of the protruding portion 18 using a snap-riveting tool positioned on the side of the free face 24 of the wall 20.

It should be noted that this method of manufacturing the electrical contact 10 in two parts allows a modular manufacture to be envisaged for different types of electrical contacts 10 that have the same type of connecting part 12 and different types of connection terminals 14, as illustrated by the first and third embodiments, or by the second and fourth embodiments. Similarly, it is possible to manufacture different types of electrical contacts 10 that have the same type of connection terminal 14 and different types of connecting parts 12, as illustrated by the first and second embodiments, or by the third and fourth embodiments.

According to a fifth embodiment illustrated in FIGS. 15 to 18, it is possible to form the through-hole 26 and the counterbore 28 on the connecting part 12, while the shoulder 16 and the protruding portion 18 are formed on the connection terminal 14. However, this variant is limited to connecting parts 12 having a wall 20 with a free face opposite a bearing face. It also requires particular attention during the snap-riveting operation, so as not to alter the functional surfaces of the connecting part 12.

In all the embodiments, the two parts 12, 14 are preferably made from an identical metallic material, in particular copper or brass, so that the connection does not undergo differential thermal deformation after assembly. The connecting part 12 has preferably undergone a surface treatment at least locally, preferably a silver or nickel plating at its functional surface intended to cooperate with another connecting part. The through-hole 26, the counterbore 28 and the protruding portion 18 do not require any particular surface treatment.

The electrical contact 10 according to the invention has been described here as an element of a fixed outlet, or base, secured to the body of a motor vehicle. But such an electrical contact may also be an element of an electrical plug, that is to say, a mobile electrical outlet at the end of a flexible cable external to the vehicle, intended to be connected to the vehicle to recharge its battery.

In all the embodiments, the connecting part 12, whether it forms a pin capable of being inserted into a socket or a socket into which a pin can be inserted, defines an insertion axis 100 that preferably coincides with the axis of the through-hole 26 and preferably constitutes an axis of symmetry for the counterbore 28. Where appropriate, the axis of insertion constitutes an axis of symmetry of revolution for the connecting part 12 of order 1 (in particular if the connecting part 12 is a pin) or of order greater than 1 (in particular if the connecting part 12 is a socket).

Naturally, the examples shown in the figures and discussed above are provided for illustrative and non-limiting purposes only. It is explicitly provided that it is possible to combine the various illustrated embodiments in order to provide others.

The connection terminal may be provided with an interface for mechanical fixing of an electrical conductor, which may be a stripped wire conductor, an electric bar or a plate, by means of a fixing element such as a screw, a rivet or a bolt.

The invention claimed is:

1. A method of manufacturing an electrical power contact for the passage of direct currents greater than 10 Amps, consisting of two separate solid conductive parts made from metal, namely a connecting part and a connection terminal for connecting the electrical power contact to a conductor, a first of the two conductive parts being provided with a shoulder and a protruding portion with respect to the shoulder, a second of the two conductive parts comprising a wall having a bearing face bearing against the shoulder and a free face opposite the bearing face, the wall being passed through by a cylindrical through-hole having an open end on the bearing face and an opposite end open on a counterbore constituting a recess in the free face, the protruding portion passing through the cylindrical through-hole, wherein the protruding portion has a flared free end forming a head housed in the counterbore, the head having a cross-section greater than a passage section of the cylindrical through-hole, forming a connection that cannot be disassembled between the two conductive parts, and the counterbore comprising a frustoconical face directly adjacent to the cylindrical through-hole, the method of manufacturing comprising:

forming the head by cold deformation, that provides a contact interface between the head and the counterbore without welding or brazing.

2. The manufacturing method of claim 1, wherein the counterbore does not undergo plastic deformation during the cold deformation of the head.

3. The manufacturing method of claim 1, wherein the cold deformation is carried out without burring.

4. The manufacturing method of claim 1, wherein the cold deformation is carried out by snap-riveting.

5. The manufacturing method of claim 1, wherein before cold deformation, the protruding portion is inserted into the cylindrical through-hole without shrinking.

6. The manufacturing method of claim 1, wherein before cold deformation, the protruding portion is inserted into the cylindrical through-hole with shrinking.

* * * * *